(12) United States Patent
Bian et al.

(10) Patent No.: US 11,166,004 B2
(45) Date of Patent: Nov. 2, 2021

(54) THREE-DIMENSIONAL COMPUTATIONAL IMAGING METHOD AND APPARATUS BASED ON SINGLE-PIXEL SENSOR, AND NON-TRANSITORY COMPUTER-READABLE STORAGE MEDIUM

(71) Applicant: Beijing Institute of Technology, Beijing (CN)

(72) Inventors: Liheng Bian, Beijing (CN); Jun Zhang, Beijing (CN); Xianbin Cao, Beijing (CN); Huayi Wang, Beijing (CN)

(73) Assignee: BEIJING INSTITUTE OF TECHNOLOGY, Beijing (CN)

( * ) Notice: Subject to any disclaimer, the term of this patent is extended or adjusted under 35 U.S.C. 154(b) by 0 days.

(21) Appl. No.: 16/930,672

(22) Filed: Jul. 16, 2020

(65) Prior Publication Data
US 2021/0021799 A1 Jan. 21, 2021

(30) Foreign Application Priority Data
Jul. 17, 2019 (CN) .......................... 201910645486.7

(51) Int. Cl.
*H04N 13/207* (2018.01)
*H04N 13/161* (2018.01)
*G01B 11/06* (2006.01)
*G06T 5/50* (2006.01)

(52) U.S. Cl.
CPC ....... *H04N 13/207* (2018.05); *G01B 11/0608* (2013.01); *G06T 5/50* (2013.01); *H04N 13/161* (2018.05); *G06T 2200/04* (2013.01); *G06T 2200/21* (2013.01)

(58) Field of Classification Search
CPC ............... H04N 13/207; H04N 13/161; G01B 11/0608; G06T 5/50; G06T 2200/04; G06T 2200/21; G01C 11/02
See application file for complete search history.

(56) References Cited

U.S. PATENT DOCUMENTS

| 8,982,363 | B2 * | 3/2015 | Goyal | .................... G01S 7/4866 356/634 |
| 2004/0011975 | A1 * | 1/2004 | Nicoli | ................ G01N 15/0227 250/574 |
| 2007/0272841 | A1 * | 11/2007 | Wiklof | .................... G01S 17/89 250/234 |

(Continued)

*Primary Examiner* — Tracy Y. Li
(74) *Attorney, Agent, or Firm* — Hodgson Russ LLP

(57) ABSTRACT

The present disclosure proposes a three-dimensional computational imaging method and apparatus based on a single-pixel sensor, and a storage medium. The method includes the following. A stripe coding is combined with a two-dimensional imaging coding through a preset optical coding to generate a new optical coding, and the new optical coding is loaded into an spatial light modulator (SLM); a two-dimensional spatial information and depth information of a scene are coupled into a one-dimensional measurement value by using a single-pixel detector and the SLM loaded with the new optical coding; and the two-dimensional spatial information and the depth information of the scene are reconstructed, from the one-dimensional measurement value through a decoupling algorithm, for three-dimensional imaging.

11 Claims, 4 Drawing Sheets one-dimensional measurement value two-dimensional recovery result of ordinary single-pixel imaging recovery result of single-pixel three-dimensional computational imaging

(56) References Cited

U.S. PATENT DOCUMENTS

2008/0296385 A1* 12/2008 Vinogradov ....... G06K 7/10811
  235/462.22
2013/0222377 A1* 8/2013 Bruls ................... H04N 19/597
  345/419
2020/0313695 A1* 10/2020 Namboodiri ...... H03M 13/3927

* cited by examiner

THREE-DIMENSIONAL COMPUTATIONAL IMAGING METHOD AND APPARATUS BASED ON SINGLE-PIXEL SENSOR, AND NON-TRANSITORY COMPUTER-READABLE STORAGE MEDIUM

CROSS-REFERENCE TO RELATED APPLICATION

The present application claims priority to Chinese Patent Application No. 201910645486.7, filed Jul. 17, 2019, the entire disclosure of which is incorporated herein by reference.

FIELD

The present disclosure relates to a field of a computational photography technology, particularly, to a three-dimensional computational imaging method and apparatus based on a single-pixel sensor, and a non-transitory computer-readable storage medium.

BACKGROUND

The traditional camera uses a two-dimensional sensor unit array as a photosensitive element, and a sensor may only sense intensity superposition information of light, so that depth information of a scene is lost in an imaging process. Therefore, a traditional photography technology acquires a projection of a three-dimensional world on a two-dimensional plane, and an obtained single image cannot accurately recover the depth and structure information of a three-dimensional scene, therefore it cannot bring a stereoscopic impression to human eyes.

A traditional three-dimensional measurement technique includes the followings. A binocular intersection measuring method which utilizes a plurality of cameras to perform a multi-angle shooting and is combined with a feature point detection; a laser scanning method which records three-dimensional coordinates of surface dense points of a measured object by using a principle of laser ranging and reconstructs three-dimensional model data of the measured object; an optical interferometry which obtains a phase by observing interference fringes generated by an interferometer, and the like. The above methods respectively need to use apparatuses such as a multi-camera, a laser scanning, a grating, a lens and the like in an experimental process, which has disadvantages of a complex optical path, a heavy system and a higher cost.

A three-dimensional imaging study in computer vision typically utilize multiple images or a 3D scanning device to recover a depth and a structure of a scene. Following methods are used in the related arts: (1) a three-dimensional curved surface measurement technology applied in a reverse engineering, which adopts a multi-view image to recover the depth; (2) a three-dimensional imaging data processing method of a flight time method, which continuously sends light pulses to a target, receives the light returned from the object by using a sensor, and detects a round-trip time of the light pulses to obtain distances (heights) of different space points of the target; (3) a structured light three-dimensional imaging technology research, which provides a three-dimensional imaging method based on Fourier fringe analysis, projects carrier frequency fringes to an object surface by using a grating device, and then obtains a deformed two-dimensional fringe image modulated by the structured light fringes on the object surface from a specific angle. The above methods usually require a multi-view camera or an additional active light source device, which increases a complexity of the hardware system.

In recent years, an emerging computational photography combines a computing, a digital sensor, an optical system, an intelligent illumination and the like, and improves a traditional camera on an aspect of an imaging mechanism so as to acquire more visual information. For example, in a single-camera light field acquisition method based on a light field theory, angle information lost by a traditional camera is acquired in a single exposure by sacrificing a spatial resolution; in a kinect depth camera published by Microsoft Corp. in 2010, a projector calibration is converted into a mature camera calibration by establishing a corresponding relation between a projector image and a camera image, so that a single-camera structured light three-dimensional measurement system is converted into a classical binocular vision system for a depth measurement.

However, a current acquisition mode of a single camera cannot effectively acquire the depth information of the scene through a small number of test times. The acquisition system based on the light field theory essentially only acquires angular information of the scene but not the depth information of the scene, and the spatial resolution is sacrificed at the same time when acquiring the angular information. Therefore, there is a need to search for a method for efficiently and stably performing depth information acquisition, thereby performing an accurate depth estimation.

A single-pixel camera as a new imaging device is characterized by having a sensing unit, and a signal-to-noise ratio of the single-pixel camera is higher because the single-pixel camera only needs a photosensitive detector. In addition, the single-pixel detector has a wider spectral response range. Moreover, the single-pixel detector can reduce requirements of data acquisition, transmission and storage based on a compressed sensing theory, so that the single-pixel detector has incomparable advantages compared with a traditional array sensor and has a wide application range.

In recent decades, the single-pixel detector has been used for a two-dimensional imaging of a wide-spectrum, such as a multi-spectral imaging, an infrared imaging, a terahertz imaging, an X-ray diffraction tomography, and the like, but an exploration of three-dimensional imaging is still in the beginning. At present, a research proposes that a plurality of single-pixel detectors are placed at different spatial positions, so as to acquire and reconstruct scene images with different visual angles and finally synthesize three-dimensional information of the scene; in addition, with respect to a three-dimensional imaging system with an improved time-of-flight based on a single-pixel, the article records a complete time of a scattered light reaching a detector by using a single-pixel detector, so that an acquisition time and a reconstruction time of a time-of-flight method are reduced; a current first single-pixel three-dimensional camera utilizes a quantum imaging technology and depends on detection and calculation of reflected light wave energy to obtain a depth of field; a single-pixel three-dimensional imaging method based on an LED array utilizes a combination of color images generated by photodiodes at different positions to obtain a three-dimensional structure. However, the above methods have high complexity and high cost, so that a method of realizing an efficient three-dimensional imaging by using a single-pixel sensor has important significance.

SUMMARY

The present disclosure seeks to solve at least one of the problems existing in the related art to at least some extent.

Accordingly, an objective of the present disclosure is to provide a three-dimensional computational imaging method based on a single-pixel sensor.

Another objective of the present disclosure is to provide a three-dimensional computational imaging apparatus based on a single-pixel sensor.

Another objective of the present disclosure is to provide a non-transitory computer-readable storage medium.

In order to achieve the above objectives, embodiments of the present disclosure provide the three-dimensional computational imaging method based on the single-pixel sensor. The method includes followings. A stripe coding is combined with a two-dimensional imaging coding through a preset optical coding, a new optical coding is generated, and the new optical coding is loaded into an optical modulator; a two-dimensional spatial information and depth information of a scene are coupled into a one-dimensional measurement value by using a single-pixel detector and the optical modulator loaded with the new optical coding; and the two-dimensional spatial information and the depth information of the scene are reconstructed, from the one-dimensional measurement value through a decoupling algorithm, for three-dimensional imaging.

In order to achieve the above objectives, embodiments of the present disclosure provide a three-dimensional computational imaging apparatus based on a single-pixel sensor. The apparatus includes one or more processors; a memory storing instructions executable by the one or more processors; in which the one or more processors are configured to: combine a stripe coding with a two-dimensional imaging coding through a preset optical coding, generate a new optical coding, and load the new optical coding into an optical modulator; couple a two-dimensional spatial information and depth information of a scene into a one-dimensional measurement value by using a single-pixel detector and the optical modulator loaded with the new optical coding; reconstruct, from the one-dimensional measurement value through a decoupling algorithm, the two-dimensional spatial information and the depth information of the scene for three-dimensional imaging.

Embodiments of the present disclosure provide a non-transitory computer-readable storage medium having stored therein instructions that, when executed by a processor of a device, cause the processor to perform a three-dimensional computational imaging method based on a single-pixel sensor, and the method includes: combining a stripe coding with a two-dimensional imaging coding through a preset optical coding, generating a new optical coding, and loading the new optical coding into an optical modulator; coupling a two-dimensional spatial information and depth information of a scene into a one-dimensional measurement value by using a single-pixel detector and the optical modulator loaded with the new optical coding; and reconstructing, from the one-dimensional measurement value through a decoupling algorithm, the two-dimensional spatial information and the depth information of the scene for three-dimensional imaging.

Additional aspects and advantages of embodiments of the present disclosure will be given in part in the following descriptions, become apparent in part from the following descriptions, or be learned from the practice of the embodiments of the present disclosure.

BRIEF DESCRIPTION OF THE DRAWINGS

The above and/or additional aspects and advantages of embodiments of the present disclosure will become apparent and more readily appreciated from the following descriptions made with reference to the drawings, in which.

DETAILED DESCRIPTION

Figure 1:
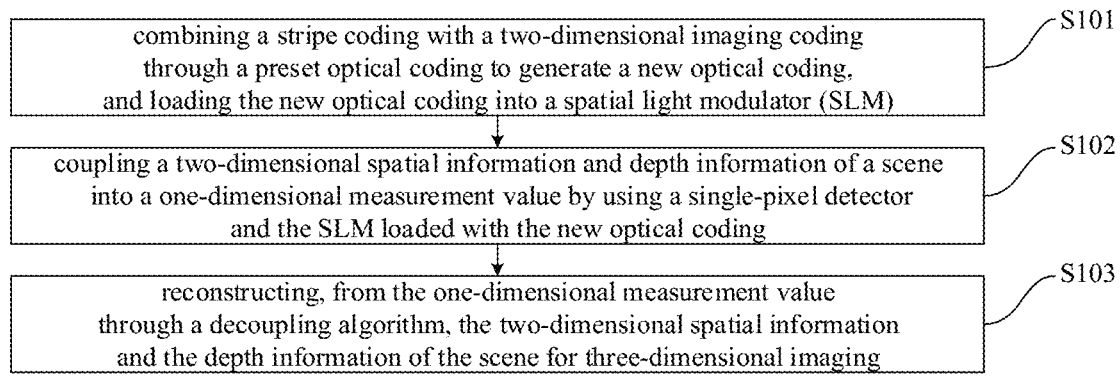
FIG. 1 is a flow chart of a three-dimensional computational imaging method based on a single-pixel sensor according to an embodiment of the present disclosure.

Embodiments of the present disclosure will be described in detail and examples of embodiments are illustrated in the drawings. The same or similar elements and the elements having the same or similar functions are denoted by like reference numerals throughout the descriptions. Embodiments described herein with reference to drawings are explanatory, serve to explain the present disclosure, and are not construed to limit embodiments of the present disclosure. A three-dimensional computational imaging method and apparatus based on a single-pixel sensor according to embodiments of the present disclosure will be described with reference to the drawings. First, the three-dimensional computational imaging method based on the single-pixel sensor according to embodiments of the present disclosure will be described with reference to the drawings.

FIG. 1 is a flow chart of the three-dimensional computational imaging method based on the single-pixel sensor according to an embodiment of the present disclosure.

As illustrated in FIG. 1, the three-dimensional computational imaging method based on the single-pixel sensor includes the followings.

At block S101, a stripe coding is combined with a two-dimensional imaging coding through a preset optical coding, a new optical coding is generated, and the new optical coding is loaded into an optical modulator.

It will be appreciated that, in the embodiment of the present disclosure, a new optical coding mode is adopted, by combining the stripe coding with the two-dimensional imaging coding, the new optical coding is generated and loaded into the optical modulator (the so called light modulator, such as a spatial light modulator (SLM)). In one embodiment of the present disclosure, the two-dimensional imaging coding includes, but is not limited to, one or more of a random coding, a Hadamard coding, and a stripe coding.

Further, in one embodiment of the present disclosure, combining the stripe coding with the two-dimensional imaging coding through the preset optical coding includes the followings. A matrix of a stripe coding multiplied by a matrix of the two-dimensional imaging coding is preset to obtain a new matrix as an input of the optical modulator, so as to effectively encode the two-dimensional spatial information and the depth information of the scene simultaneously.

It will be appreciated that, in embodiments of the present disclosure, the matrix of the stripe coding multiplied by the matrix of the two-dimensional imaging coding is preset to obtain the new matrix as the input of a structured optical modulator, so as to effectively encode the two-dimensional spatial information and the depth information of the scene simultaneously.

At block S102, a two-dimensional spatial information and depth information of a scene are coupled into a one-dimensional measurement value by using a single-pixel detector and the optical modulator loaded with the new optical coding.

It will be appreciated that, the modulated two-dimensional spatial information and the depth information of the scene are coupled into the one-dimensional measurement using a single-pixel detector. The single-pixel detector and the spatial light modulator are used for completing a coding coupling acquisition of the three-dimensional information of the scene.

At block S103, the two-dimensional spatial information and the depth information of the scene for three-dimensional imaging are reconstructed from the one-dimensional measurement value through a decoupling algorithm.

It will be appreciated that, in the embodiment of the present disclosure, the two-dimensional information and the depth information of the scene may be reconstructed with a high precision by using the decoupling algorithm. That is, in embodiments of the present disclosure, the decoupling algorithm based on a compressed sensing method, an alternative projection method or a deep learning theory to reconstruct the two-dimensional spatial information of the scene with the high precision from the one-dimensional measurement value. The decoupling algorithm includes one or more of a non-iteration (a matrix inversion, a traditional correlation, a differential ghost Imaging (DGI)) method, a linear iteration (a gradient descent (GD), a conjugate gradient descent (CGD) method, a Poisson maximum likelihood (PSO) method, an alternative projection (AP)) method, a nonlinear iteration (a sparse representation compressed sensing method (SR-CS), a total variation compressive sensing method (TV-CS)) and a deep learning method, so as to perform a two-dimensional spatial information decoupling.

Further, in one embodiment of the present disclosure, reconstructing the two-dimensional spatial information and the depth information of the scene for three-dimensional imaging includes the followings. The reconstruction is performed through the decoupling algorithm to obtain the deformed optical field image.

It will be appreciated that, in embodiments of the present disclosure, the deformed optical field image is obtained by using a two-dimensional spatial decoupling method, then a phase distribution is calculated according to a phase shift function according to a discrete phase shift technology to obtain a scene depth.

Further, in one embodiment of the present disclosure, reconstructing the two-dimensional spatial information and the depth information of the scene for three-dimensional imaging further includes the following. The phase distribution is calculated through a phase measurement profile method; and height information of an object surface is obtained by using a geometric relation according to the phase distribution.

It will be appreciated that, a PMP (phase measurement profilometry) may be adopted in embodiments of the present disclosure, the phase distribution is calculated by an N-step phase shift method, and finally the height information of the object surface is obtained by using the geometric relation.

An example of an imaging mode of the single-pixel sensor and an application thereof to the three-dimensional computational imaging and a depth measurement is given below. The specific implementation method includes a hardware system description and an algorithm reconstruction, which can be summarized as follows. A new optical coding mode is designed in advance before the experiment, that is, a dot product of a stripe matrix and a two-dimensional imaging coding is obtained, such that a new matrix is generated as an input of the optical modulator, and the new matrix is used for encoding and modulating structure-depth three-dimensional information of the scene, and a single-pixel detector is used for performing a coupling and an acquisition to obtain a one-dimensional light intensity superposition value. The reconstruction algorithm for resolving a single-pixel may perform the two-dimensional imaging by using the following various methods, but is not limited to the following methods, and further perform the three-dimensional imaging by using a phase shift method. The method includes the followings.

1. Hardware System Implementation

Figure 2:
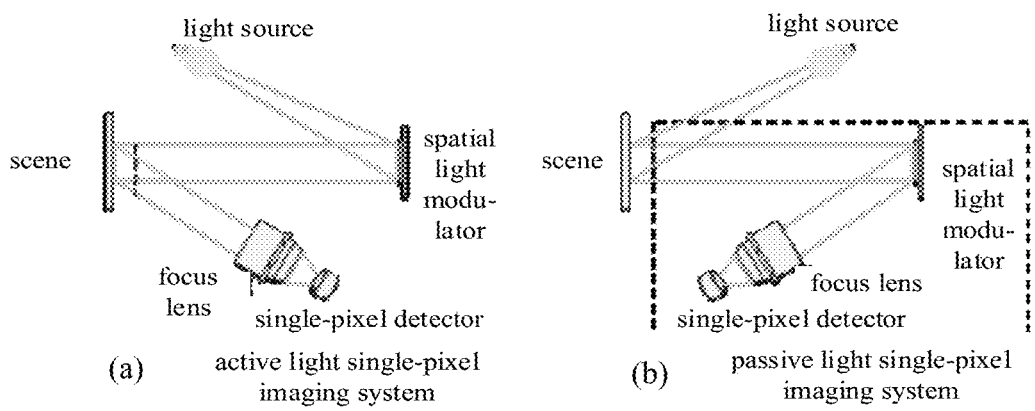
FIG. 2 is a schematic diagram of an optical path of a conventional single-pixel imaging system according to an embodiment of the present disclosure.

To build the hardware system, a single-pixel imaging uses a light modulator to modulate a light pattern. The reflected or transmitted light from a target scene is ultimately collected by the single-pixel detector, as illustrated in FIG. 2. A two-dimensional object scene may be reconstructed by using various algorithms, such as a non-iterative method, a linear iterative method, a non-linear iterative method, and a deep learning method (specifically, as described above).

FIG. 2 shows light paths of two common single-pixel imaging systems: (a) the left drawing shows a light path of an active single-pixel imaging system, in the active single-pixel detection system, the light modulator is located between an active light source and the target scene; (b) the right drawing shows a light path of a passive single-pixel imaging system, in the passive single-pixel detection system, the light modulator is located between the target scene and a detection module, and this configuration does not require an active light source.

Figure 3:
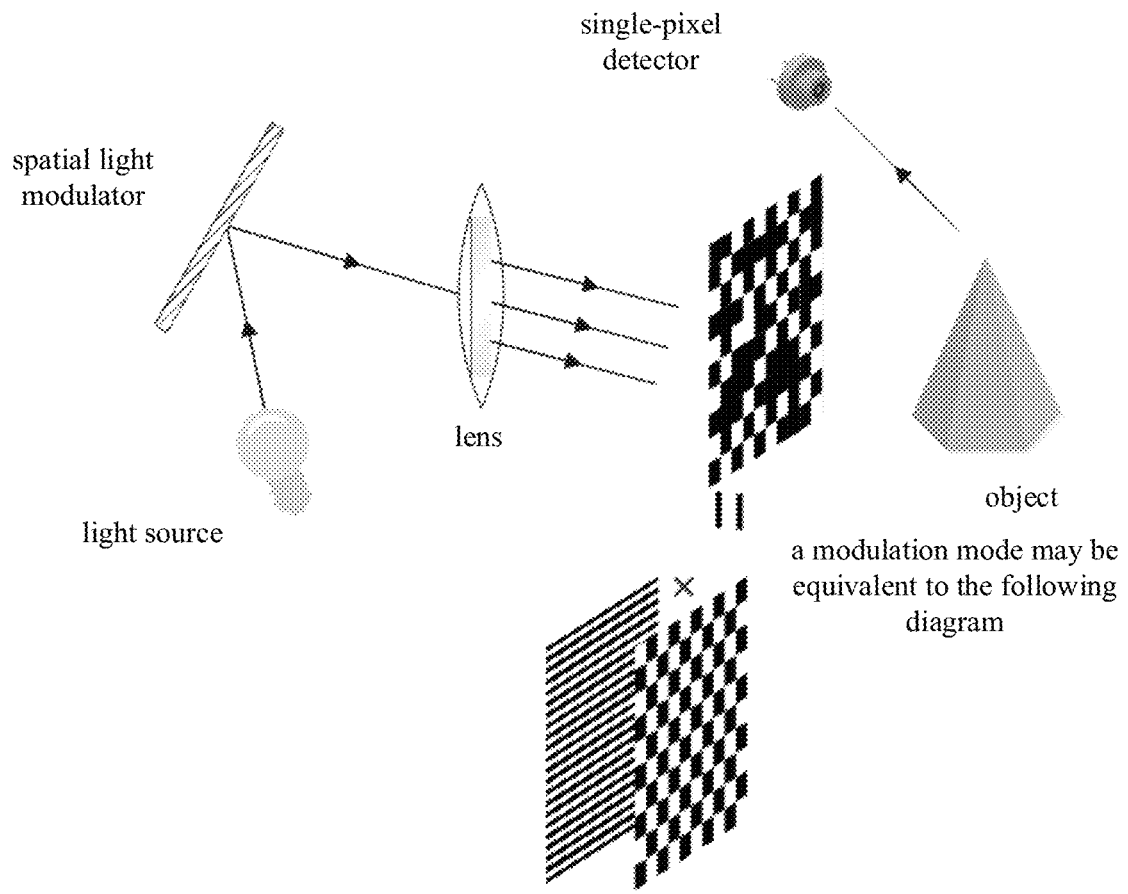
FIG. 3 is a schematic diagram of a system for a three-dimensional computational imaging method based on a single-pixel sensor according to an embodiment of the present disclosure.

For the hardware system, these two building modes of the active light system and the passive light system are both suitable for the present disclosure. The active one is taken as an example for the description, of which an improvement and innovation are shown in FIG. 3. It can be seen that, a pre-coding setting part of the spatial light modulator is processed to make a stripe pattern is hidden on a mask image. This modulation mode may effectively modulate the three-dimensional information of the scene without adding other elements such as a grating and the like, and finally enables the detector to receive a one-dimensional measurement value including the three-dimensional information.

2. Algorithm Reconstruction-Two-Dimensional Information Decoupling

A two-dimensional computational imaging scheme based on the single-pixel sensor is a linear system. In particular, a measurement model may be described as:

$$Ax=b,$$

where $A \in R^{m \times n}$ represents a light modulation matrix (m represents a number of modulation modes, each modulation mode includes n pixels), $x \in R^{n \times 1}$ represents the target scene to be reconstructed (aligned as a vector), and $b \in R^{m \times 1}$ represents a measurement vector.

The reconstruction of the single-pixel detector refers to calculating from the modulation mode A and the corresponding measurement value b to obtain x. In the present disclosure, a two-dimensional graph may be recovered according to different algorithms, and then the height information of the object surface is solved via the two-dimensional graph combined with a geometric relation.

Algorithms for single-pixel two-dimensional imaging may include: the non-iterative method, the linear iterative method and the non-linear iterative method. The above algorithms include the matrix inversion, the conventional correlated imaging, the differential ghost imaging (DGI), the gradient descent (GD), the conjugate gradient descent (CGD), the Poisson maximum likelihood method, the alternative projection (AP), the sparse representation compressed sensing method (SR-CS), the total variation compressed sensing method (TV-CS), etc. Any one of the above algorithms may be used to solve a required result according to the imaging requirements of the user.

Figure 4:
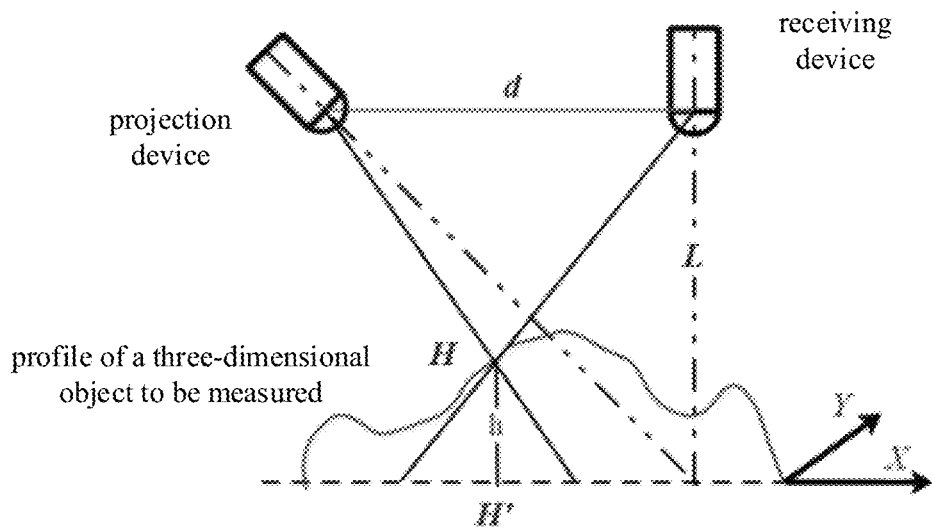
FIG. 4 is a schematic diagram of an optical path of a projected grating phase method according to an embodiment of the present disclosure.

3. Algorithm Reconstruction-Depth Information Decoupling:

For the three-dimensional reconstruction, a specific principle is to use a phase shift profile method to perform the reconstruction. The method is based on a sinusoidal grating projection, a deformed light field image is obtained by a method of moving a grating by hardware or software, the phase distribution is calculated according to a N-step phase shift algorithm according to the discrete phase shift technology, and finally the height information of the object surface is obtained by using the geometric relation. An optical path structure of the phase shift method is illustrated in FIG. 4. Taking a point H on the surface of the object to be measured in FIG. 4 as an example, the formula may be represented by:

$$h = \frac{L p_0 \Delta \phi}{2\pi d + p_0 \Delta \phi}$$

where, $P_0$ represents a period of a sinusoidal grating. When both a projection system and the imaging system are far from the object, a focus bias in the depth range of the object may be negligible. When a sinusoidal pattern is projected onto a three-dimensional diffuse object, its distorted light field detected by imaging may be described as:

$$I(x,y)=R(x,y)\{A(x,y)+B(x,y)\cos[\phi(x,y)]\},$$

where R(x, y) represents a reflectivity of each point on the surface, A(x, y) represents a background light intensity, B(x, y)/A(x, y) represents a stripe contrast, a phase function $\phi(x, y)$ represents a feature of a stripe pattern, so that the height information of the object surface shape is included. Since the reflectivity R(x, y) of each point of the object is little changed, it may be assumed as a constant value (1 in general), the above formula may be rewritten as follows:

$$I(x,y)=A(x,y)+B(x,y)\cos[\phi(x,y)].$$

The detection array samples the object, measures a phase of each sampling point by using the phase shift technology, and records N(N≥3) light intensity values. For each image, the grating moves $p_0/N$, assuming $I_1, I_2, \ldots, I_n$ are the light intensity values of a same point C, then $$\tan\phi_C = \frac{\sum_{n=1}^{N} I_n(x,y) \times \sin(2\pi n/N)}{\sum_{n=1}^{N} I_n(x,y) \times \cos(2\pi n/N)},$$

in which, since the phase determined by the above equation is π-modulo, signs of sin φ and cos φ must be determined if the determined phase is 2π-modulo, the process also known as a phase ambiguity removing.

In order to calculate a height distribution of the object to be measured from the phase function, a wrapped phase obtained by an inverse trigonometric operation should be unwrapped into an original phase distribution to obtain a continuously distributed two-dimensional phase function $\phi_n(x, y)$. For this purpose, a wrapped phase data matrix is unfolded along a row or column direction of the wrapped phase data matrix, phase values of two adjacent points are compared in the unfolding direction, and if a difference value is smaller than −π, the phase value of the latter point should be added by 2π; if the difference is greater than π, the phase of the latter point should be subtracted by 2π. In the above process, it has been assumed in practice that the unwrapped phase change between any two adjacent samples is smaller than π, that is, requirements of a sampling theorem must be satisfied, and that there are at least two samples per stripe, that is, a sampling frequency is greater than twice a highest spatial frequency. The unwrapped phase value of any point on the imaging surface may be utilized to calculate the height value of a corresponding point on the object surface.

Figure 5:
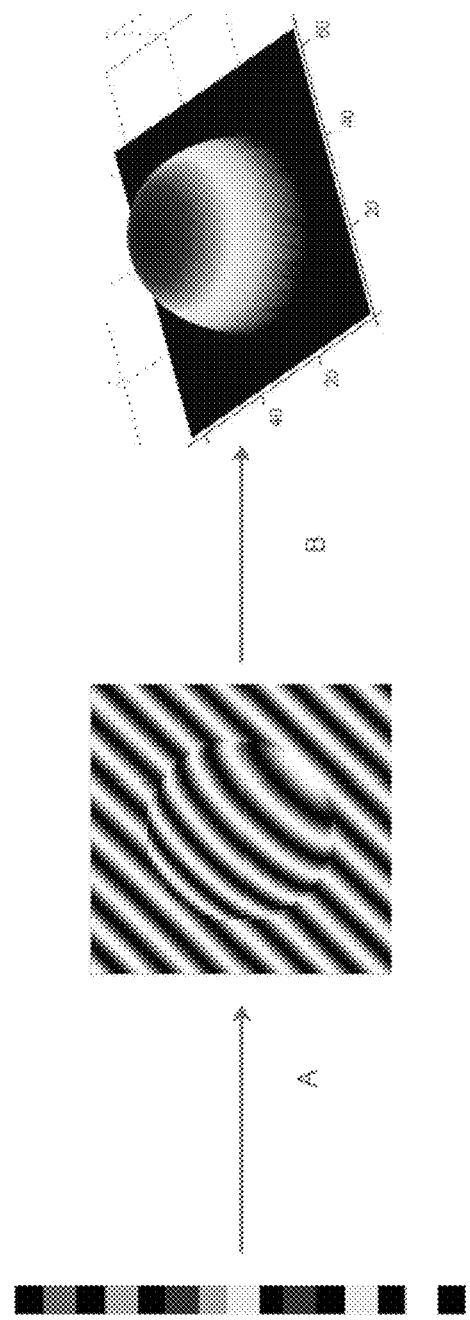
FIG. 5 is a schematic diagram of an integrity restoration of a software algorithm according to an embodiment of the present disclosure.

Finally, a software complete algorithm flow chart from a one-dimensional single-pixel measurement to a two-dimensional recovery and a three-dimensional reconstruction completion is given, as illustrated in FIG. 5. Taking an example of recovering a three-dimensional surface of a semicircle, a pixel size is 64×64, a center of the semicircle is (32, 32), a radius is 18 pixels, and a number of acquired one-dimensional measurement values is 4000, as illustrated in FIG. 5.

In summary, the conventional camera uses a two-dimensional sensor unit array as a photosensitive element, and the sensor can only sense the intensity superposition information of light, and the depth information of the scene is lost in the imaging process. In addition, the signal-to-noise ratio of the traditional camera sensor is low, and a sensed spectral range is limited. In order to solve the above problems, embodiments of the present disclosure provide the three-dimensional computational imaging method and apparatus based on the single-pixel sensor. Firstly, the new optical coding mode is designed by combining the stripe coding and the two-dimensional imaging coding, so that two-dimensional space information and the depth information of the scene are encoded simultaneously. And then, the coding information is coupled and acquired by using the single-pixel sensor to obtain the one-dimensional measurement data. Finally, the high-precision reconstruction is performed on the three-dimensional information (including the two-dimensional spatial information and the depth information) of the scene by using the decoupling algorithm based on the compressed sensing, the alternative projection or the depth learning theory. According to the present disclosure, the depth information of the scene may be effectively acquired in the single-pixel imaging system by changing the optical coding mode and the corresponding decoupling algorithm without adding any hardware, it has important significance for recovering an object depth by using a small number of acquisition values and simplifying system construction, and has wide application in the fields of three-dimensional imaging, multimedia processing and the like.

According to the three-dimensional computational imaging method based on the single-pixel sensor, the new optical coding mode is adopted to combine the stripe coding and the two-dimensional imaging coding, then the single-pixel detector is utilized to couple and acquire the three-dimensional information of the scene, and finally the decoupling algorithm is used to reconstruct the three-dimensional information of the scene; the optical coding mode of combining the stripe coding and the two-dimensional imaging coding may be realized without changing the original integral optical path system; the decoupling algorithm for analyzing the three-dimensional information from the one-dimensional measurement value may be realized on hardware systems such as a common computer or a development board, and the like. A simple system construction may be realized, so that the method is convenient for a multi-domain application.

The three-dimensional computational imaging apparatus based on the single-pixel sensor according to an embodiment of the present disclosure will be described next with reference to the accompanying drawings.

Figure 6:
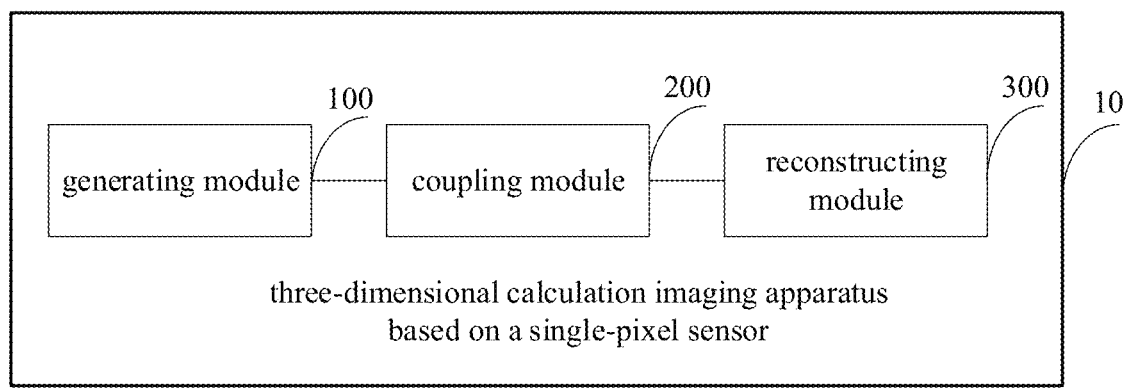
FIG. 6 is a structural diagram of a three-dimensional computational imaging apparatus based on a single-pixel sensor according to an embodiment of the present disclosure.

FIG. 6 is a schematic structural diagram of the three-dimensional computational imaging apparatus based on the single-pixel sensor according to an embodiment of the present disclosure.

As illustrated in FIG. 6, the three-dimensional computational imaging apparatus 10 based on the single-pixel sensor includes a generation module 100, a coupling module 200 and a reconstructing module 300.

The generating module 100 is configured to combine a stripe coding with a two-dimensional imaging coding through a preset optical coding, generate a new optical coding, and load the new optical coding into an optical modulator. The coupling module 200 is configured to couple a two-dimensional spatial information and depth information of a scene into a one-dimensional measurement value by using a single-pixel detector and the optical modulator loaded with the new optical coding. The reconstructing module 300 is configured to reconstruct, from the one-dimensional measurement value through a decoupling algorithm, the two-dimensional spatial information and the depth information of the scene for three-dimensional imaging. The apparatus 10 of embodiments of the present disclosure may be applied in a case of a wide spectral range, may effectively recover a depth of a scene or a thickness of each point of a three-dimensional object to be measured, and solves a problem that the depth cannot be effectively acquired in a traditional single-pixel imaging through a designed new coding mechanism.

Further, in one embodiment of the present disclosure, the generating module 100 is further configured to preset the matrix of the stripe coding multiplied by the matrix of the two-dimensional imaging coding to obtain the new matrix as the input of the optical modulator, so as to effectively encode the two-dimensional spatial information and the depth information of the scene simultaneously.

Further, in one embodiment of the present disclosure, the two-dimensional imaging code includes, but is not limited to, one or more of the random coding, the Hadamard coding, and the stripe coding.

Further, in one embodiment of the present disclosure, the decoupling algorithm includes, but is not limited to, one or more of the non-iterative method, the linear iterative method, the non-linear iterative method the a deep learning method, and the decoupling algorithm is used to decouple the two-dimensional spatial information, the non-iterative method includes the matrix inversion, the correlated imaging, and the differential ghost imaging, the linear iterative method includes the gradient descent, the conjugate gradient descent, the Poisson maximum likelihood method, and the alternative projection method, and the non-linear iterative method includes the sparse representation compressed sensing method and the total variation compressed sensing method.

Further, in one embodiment of the present disclosure, the reconstructing module 300 is further configured to perform the reconstruction through the decoupling algorithm to obtain the deformed optical field image.

Further, in one embodiment of the present disclosure, the reconstructing module 300 is further configured to calculate the phase distribution through the phase measurement profile method, and obtain the height information of the object surface by using the geometric relation according to the phase distribution.

It should be noted that the foregoing explanation of embodiments of the three-dimensional computational imaging method based on the single-pixel sensor is also applicable to the three-dimensional computational imaging apparatus based on the single-pixel sensor of this embodiment, which is not elaborated here.

According to the three-dimensional computational imaging apparatus based on the single-pixel sensor, the new optical coding mode is adopted to combine the stripe coding and the two-dimensional imaging coding, then the single-pixel detector is utilized to couple and acquire the three-dimensional information of the scene, and finally the decoupling algorithm is used to reconstruct the three-dimensional information of the scene; the optical coding mode of combining the stripe coding and the two-dimensional imaging coding may be realized without changing the original integral optical path system; the decoupling algorithm for analyzing the three-dimensional information from the one-dimensional measurement value may be realized on hardware systems such as the common computer or the development board, and the like. A simple system construction may be realized, so that the apparatus is convenient for the multi-domain application.

Embodiments of the present disclosure provide a non-transitory computer-readable storage medium having stored therein instructions that, when executed by a processor of a device, cause the processor to perform the three-dimensional computational imaging method based on a single-pixel sensor according to embodiments of the present disclosure.

In addition, terms such as "first" and "second" are used herein for purposes of description and are not intended to indicate or imply relative importance or significance. Thus, the feature defined with "first" and "second" may comprise one or more this feature. In the description of the present disclosure, "a plurality of" means at least two, for example, two or three, unless specified otherwise.

Reference throughout this specification to "an embodiment," "some embodiments," "an example," "a specific example," or "some examples" means that a particular feature, structure, material, or characteristic described in connection with the embodiment or example is included in at least one embodiment or example of the present disclosure. The appearances of the above phrases in various places throughout this specification are not necessarily referring to the same embodiment or example of the present disclosure. Furthermore, the particular features, structures, materials, or characteristics may be combined in any suitable manner in one or more embodiments or examples. In addition, different embodiments or examples and features of different embodiments or examples described in the specification may be combined by those skilled in the art without mutual contradiction.

The various device components, modules, units, circuits, sub-circuits, blocks, or portions may have modular configurations, or are composed of discrete components, but nonetheless can be referred to as "modules" in general. In other words, the "components," "modules," "units," "circuits," "sub-circuits," "blocks," or "portions" referred to herein may or may not be in modular forms, and these phrases may be interchangeably used.

In the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer. Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures. Although embodiments of present disclosure have been shown and described above, it should be understood that above embodiments are just explanatory, and cannot be construed to limit the present disclosure, for those skilled in the art, changes, modifications, alternatives, and variations can be made to the embodiments within the scope of the present disclosure.

What is claimed is:

1. A three-dimensional computational imaging method based on a single-pixel sensor, comprising:
    combining a stripe code with a two-dimensional imaging code through a preset optical coding, generating a new optical code, and loading the new optical code into an optical modulator, comprising: presetting a matrix of the stripe code multiplied by a matrix of the two-dimensional imaging code to obtain a new matrix as an input of the optical modulator, so as to encode two-dimensional spatial information and depth information of a scene simultaneously;
    coupling the two-dimensional spatial information and the depth information of the scene into a one-dimensional measurement value by using a single-pixel detector and the optical modulator loaded with the new optical code; and
    reconstructing, from the one-dimensional measurement value through a decoupling algorithm, the two-dimensional spatial information and the depth information of the scene for three-dimensional imaging.

2. The method of claim 1, wherein the two-dimensional imaging code comprises one or more of a random code, a Hadamard code, and a stripe code.

3. The method of claim 1, wherein the decoupling algorithm comprises one or more of a non-iterative method, a linear iterative method, a non-linear iterative method and a deep learning method, and the decoupling algorithm is used to decouple the two-dimensional spatial information, wherein the non-iterative method comprises a matrix inversion method, a correlation reconstruction method, and a differential ghost imaging method, the linear iterative method comprises a gradient descent method, a conjugate gradient descent method, a Poisson maximum likelihood method, and an alternative projection method, and the non-linear iterative method comprises a sparse representation compressed sensing method and a total variation compressed sensing method.

4. The method of claim 1, wherein reconstructing, from the one-dimensional measurement value through the decoupling algorithm, the two-dimensional spatial information and the depth information of the scene for three-dimensional imaging comprises:
performing reconstruction through the decoupling algorithm to obtain a deformed optical field image.

5. The method of claim 4, wherein reconstructing, from the one-dimensional measurement value through a decoupling algorithm, the two-dimensional spatial information and the depth information of the scene for three-dimensional imaging comprises:
calculating a phase distribution from the deformed optical field image through a phase measurement profile method; and
obtaining height information of an object surface by using a geometric relation according to the phase distribution.

6. A three-dimensional computational imaging apparatus based on a single-pixel sensor, comprising:
one or more processors; and
a memory storing instructions executable by the one or more processors;
wherein the one or more processors are configured to:
combine a stripe code with a two-dimensional imaging code through a preset optical coding, generate a new optical code, and load the new optical code into an optical modulator by presetting a matrix of the stripe code multiplied by a matrix of the two-dimensional imaging code to obtain a new matrix as an input of the optical modulator, so as to encode two-dimensional spatial information and depth information of a scene simultaneously;
couple the two-dimensional spatial information and the depth information of the scene into a one-dimensional measurement value by using a single-pixel detector and the optical modulator loaded with the new optical code; and
reconstruct, from the one-dimensional measurement value through a decoupling algorithm, the two-dimensional spatial information and the depth information of the scene for three-dimensional imaging.

7. The apparatus of claim 6, wherein the two-dimensional imaging code comprises one or more of a random code, a Hadamard code, and a stripe code.

8. The apparatus of claim 6, wherein the decoupling algorithm comprises one or more of a non-iterative method, a linear iterative method, a non-linear iterative method and a deep learning method, and the decoupling algorithm is used to decouple the two-dimensional spatial information, wherein the non-iterative method comprises a matrix inversion, a correlated imaging, and a differential ghost imaging, the linear iterative method comprises a gradient descent, a conjugate gradient descent, a Poisson maximum likelihood method, and an alternative projection method, and the non-linear iterative method comprises a sparse representation compressed sensing method and a total variation compressed sensing method.

9. The apparatus according to claim 6, wherein the one or more processors are configured to perform reconstruction through the decoupling algorithm to obtain a deformed optical field image.

10. The apparatus according to claim 6, wherein the one or more processors are configured to calculate a phase distribution through a phase measurement profile method; and obtain height information of an object surface by using a geometric relation according to the phase distribution.

11. A non-transitory computer-readable storage medium having stored therein instructions that, when executed by a processor of a device, cause the processor to perform a three-dimensional computational imaging method based on a single-pixel sensor, and the method comprises:
combining a stripe code with a two-dimensional imaging code through a preset optical coding, generating a new optical code, and loading the new optical code into an optical modulator, comprising: presetting a matrix of the stripe code multiplied by a matrix of the two-dimensional imaging code to obtain a new matrix as an input of the optical modulator, so as to encode two-dimensional spatial information and depth information of a scene simultaneously;
coupling the two-dimensional spatial information and the depth information of the scene into a one-dimensional measurement value by using a single-pixel detector and the optical modulator loaded with the new optical code; and
reconstructing, from the one-dimensional measurement value through a decoupling algorithm, the two-dimensional spatial information and the depth information of the scene for three-dimensional imaging.

* * * * *